Feb. 6, 1934.  G. A. TURNER  1,945,758
FRUIT DUMPING METHOD AND APPARATUS
Filed Jan. 4, 1933
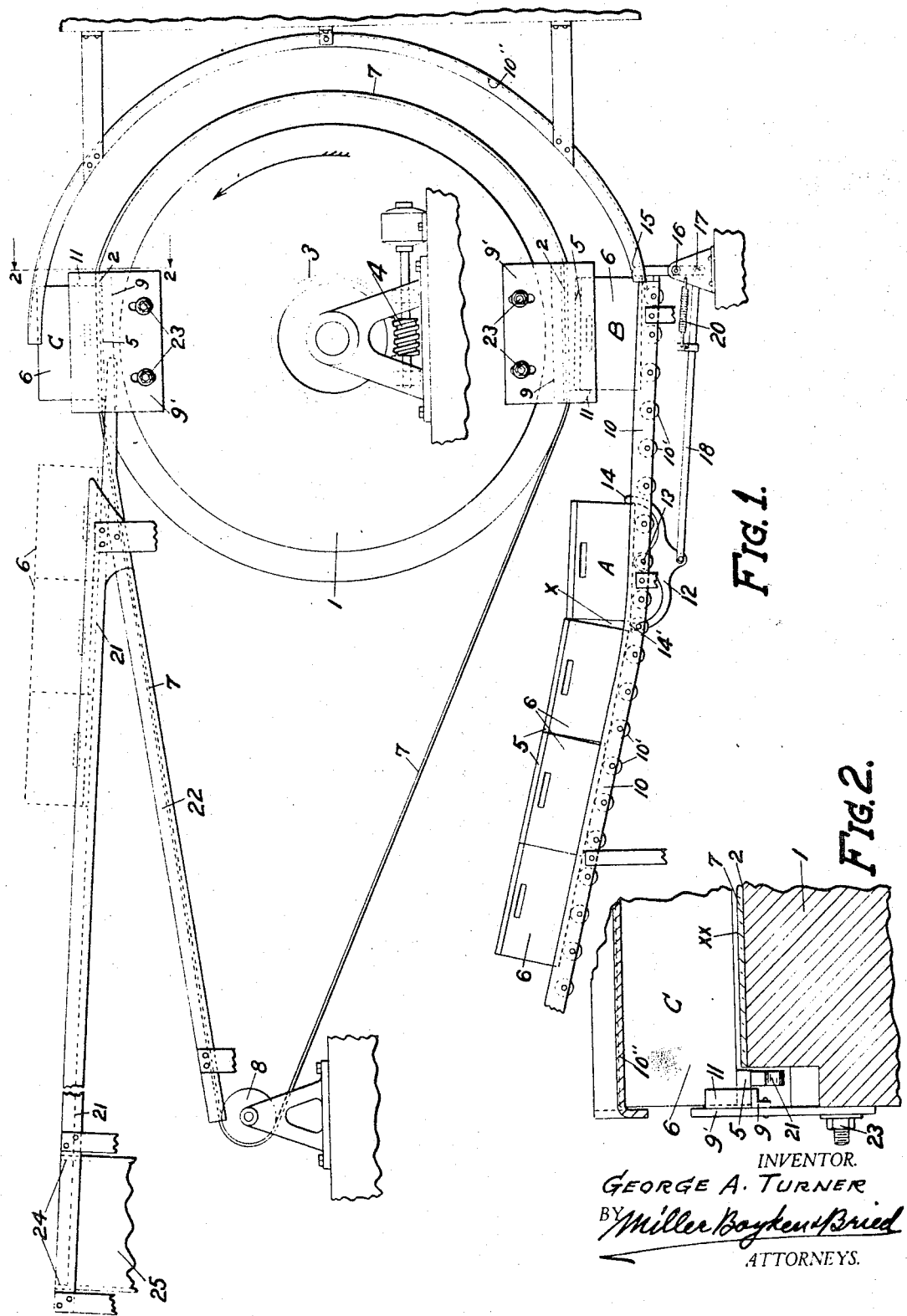
INVENTOR.
GEORGE A. TURNER
BY Miller Boyken & Bried
ATTORNEYS.

Patented Feb. 6, 1934

1,945,758

UNITED STATES PATENT OFFICE 1,945,758

FRUIT DUMPING METHOD AND APPARATUS

George A. Turner, Stockton, Calif.

Application January 4, 1933. Serial No. 650,069

9 Claims. (Cl. 214—1.1)

This invention relates to the fruit industry in connection with packing and shipping, and has for its object a method and means for dumping the boxes of fresh fruit as received from the fields, without bumping or otherwise injuring the fruit, so that it will be in better shape for subsequent operations or for sale after packing.

Before describing the invention it would be well to state that according to the present practice the fresh fruit is picked and placed in boxes in the field, transported to the packing houses and there dumped out of the boxes for grading, cleaning, packing, or canning, as may be desired. The dumping of the fruit is accomplished by simply inverting the boxes and permitting the fruit to fall out, either into a chute, conveyor, or other device, and if the fruit is of a naturally delicate nature such as pears, it is frequently injured by being bumped and abraded so that the fruit speedily develops soft spots as well as unsightly dark patches and streaks. One of the particular objects of the present invention is to provide means for avoiding this initial injury to the fruit so that an originally high grade product will be maintained as much as possible in that condition for the market.

While the invention to be described uses the word "fruit" to designate the commodity being handled, this work is intended to include either fruits or vegetables which are liable to injury when handled in the ordinary manner.

Briefly described my invention comprises placing each full box of fruit on a device which will cover the box so that the contents cannot fall out when the box is inverted, invert the covered box, and gently lift the box while moving the covering material to carry the fruit away. Thus any detrimental falling of the fruit is entirely prevented, and likewise any rubbing or sliding of the fruit on the receiving surface.

In the drawing accompanying this specification, Fig. 1 is a side elevation of apparatus which will carry out the invention.

Fig. 2 is an enlarged vertical section of a portion of the device as seen from the line 2—2 of Fig. 1 to show the relation of the fruit box supporting drum, covering belt, box pushing lugs, etc.

In further detail, 1 is a revolvable drum with flat spaces 2 of a size to cover the boxes to be handled. This drum is revolvably mounted as indicated and may be revolved in direction of the arrow by any suitable drive arrangement, such as the worm wheel 3 and worm 4 indicated. There may be any number of flat spaces around the drum, but only two are shown as the drum may be revolved at a speed to handle two or three boxes a minute which is generally sufficient. This drum is of a width to come within the transverse cleats 5 of a "lug-box" 6 as shown best in Fig. 2. The drum is traversed by a belt 7 of equal width which extends outwardly and over a pulley 8. At the side of the drum are supports 9 upon which the outer ends of the box rest when inverted as shown in Fig. 2, the box being held endwise in proper position by outer side plates 9'.

The lug boxes full of fruit may be placed one at a time on a gravity roller conveyor 10 at position A and roll down the conveyor to a point B and stop where the conveyor curves upwardly. The curve of the conveyor gradually closes in toward the drum until it is concentric with the axis of the drum. The idler rollers indicated at 10' on the gravity run may be omitted on the upwardly curved run which may therefore consist of simple rails 10" or even a solid sheet of metal for the bottom of the box to slide against.

The drum is provided with outwardly projecting box driving lugs 11 at both sides just in back of the box supports 9 so that as the drum is rotated these lugs engage a box of fruit stopped at B and carry it around the curved conveyor or guide 10" until it reaches an inverted position C on top of the drum, the belt 7, however, effectually covers the box the moment the box begins to ascend the curved guide so that no fruit can spill out or become wedged between the drum and the box.

Instead of placing the boxes one at a time on the gravity conveyor at A, the conveyor may be extended to the left from that point, at a slightly steeper angle and filled with boxes as indicated, and an automatic box tripper provided at point A to deliver them one at a time to point B. This tripper may take the form of a rocker 12 pivoted at 13 to any rigid support and the rocker provided with forward prongs 14 adapted to come up in front of the box when at A and hold it there as well as prevent the rest of the boxes from coming down, and rearward prongs as at 14' to come up in front of the next box. This rocker cooperates with a second rocking device 15 which is positioned in front of the box at the point B. This latter device 15 is a lever pivoted at 16 to a rigid support and below the point of pivoting is pivotally connected at 17 to one end of a rod 18 which in turn is pivoted at its other end at 19 to a point on rocker 12 in a manner so that when lever 15 is pushed to the right or downward by the box being carried onward by the drum, it will throw rocker 12 to the left and thus lift prongs 14' up in front of the next box in the space X between the two lower portions of the two boxes caused by change of angularity of the conveyor at that point.

Thus, as the box at B is carried forward by the drum, the box at A will be released to roll down the conveyor and the remaining boxes will be stopped. Then as soon as box B has cleared lever 15 it will fly back to position in front of the next box at B and release another box from the row to roll to position A. This return movement of lever 15 is caused by a tension spring 20 hooked from a fixed point to rod 18.

When the box reaches the uppermost inverted position it is picked off of the drum by a pair of tracks 21 which engage under box cleats 5, as best shown in Fig. 2, and gradually separate the leading side of the box from the belt 7 which continues outward at a slight angle towards pulley 8. During continued rotation of the drum the driving lugs 9 push the box onto the tracks 21 and the fruit is gently deposited upon the belt all moving at the same speed so that no abrasion of the fruit takes place. The fruit is deposited in the form of a layer on the belt, and side guard rails 22 in the plane of the box receiving rails 21 prevent any of the fruit from rolling off the edge of the belt.

The fruit thus gently emptied from the box without bumping or other injury is carried along the belt for delivery to any desired mechanisms for cleaning, grading, packing, etc.

By a consideration of Fig. 2 it will be noticed that the box supports 9 carried by the drum are adjustable in slots on bolts 23 so as to determine the clearance XX between the belt and the box, for in case of pears this may be considerably more than for cherries. No particular importance attaches to the specific construction of the drum as it may be either of wood, sheet metal or merely a skeleton, as its function is only as a means to support the box and belt in covering relation while they are being inverted.

By a consideration of Fig. 1 it will be evident that the machine may be driven by turning pulley 8 to turn the drum by the belt 8 itself instead of driving the drum, also various changes in detail and arrangement of parts may be made without affecting the principle of the invention or its mode of operation.

During continued running of the machine the empty inverted boxes are shoved one against the other along rails 21 and may pass along to drop off at the ends of these rails or one rail may have a gap in it as indicated at 24 to discharge them to a suitable chute or conveyor 25.

Having thus described my invention and the general form of apparatus for carrying it out, what I claim is:—

1. Box handling equipment comprising means for supporting a box of fruit with open side of box directed upwardly, a belt adapted for covering the box, means for covering the box with said belt, means for advancing the box and its covering belt and inverting both box and belt, and means for separating the box from the belt whereby the fruit is deposited upon the belt.

2. Box handling equipment comprising means for supporting a box of fruit with open side of box directed upwardly, a belt adapted for covering the box, means for covering the box with said belt, means for advancing the box and its covering belt and inverting both box and belt, and means for gradually separating the box from the belt, starting at the leading edge of the box, whereby the fruit is deposited as a layer upon the belt.

3. In a structure as specified in claim 1, said belt being endless and extending laterally from the point of depositing the fruit thereon for carrying the fruit in a layer from said point.

4. In apparatus for handling open boxes of fruit, a revolvable drum-like device, a belt extending around the drum-like device and laterally therefrom, means for positioning an open top box of fruit adjacent the lower part of the drum-like device with said belt covering the fruit in the box, means for engaging said box as the drum revolves and carrying the box over the drum-like device to invert the box and deposit its fruit upon said belt, and means for diverting the inverted box from said drum-like device and belt so that the fruit is carried away on said belt.

5. In a structure as specified in claim 4, a curved guide to support the bottom of the box as it is carried over the drum-like device.

6. In a structure as specified in claim 4, means fixed to said drum for supporting the inverted box at its ends clear of said belt.

7. In a structure as specified in claim 4, the first mentioned means comprising a gravity conveyor leading to a point below the drum-like device formed with an abrupt change of angularity to produce a space between two boxes at the lower edges thereof, a trip arranged to hold back a row of boxes on said conveyor provided with a finger operating in said space, another trip in the path of the boxes in advance of the first trip adapted to be engaged by a box in traveling, and means operated by movement of the second trip operatively connected to the first trip releasing one box at a time from said row.

8. In a structure as specified in claim 4, the first mentioned means comprising a gravity conveyor leading to a point below the drum-like device formed with an abrupt change of angularity to produce a space between two boxes at the lower edges thereof, a trip arranged to hold back a row of boxes on said conveyor provided with a finger operating in said space, another trip in the path of the boxes in advance of the first trip adapted to be engaged by a box in traveling and means operated by movement of the second trip operatively connected to the first trip releasing one box at a time from said row, said gravity conveyor arranged with a change of angle adjacent the first trip to provide a working space between the two first boxes of the row.

9. In a structure as specified in claim 4, said drum-like device provided with means causing said belt to extend flat across the box.

GEORGE A. TURNER.